Nov. 25, 1969 O. STÜRZINGER 3,480,729

APPARATUS FOR OBTAINING REDUCED TELECOMMUNICATION ALPHABETS AND CIRCUITS

Filed March 10, 1966 3 Sheets-Sheet 1

Oskar Stürzinger, Inventor

By Wenderoth, Lind & Ponack, Attys.

Nov. 25, 1969 O. STÜRZINGER 3,480,729
APPARATUS FOR OBTAINING REDUCED TELECOMMUNICATION
ALPHABETS AND CIRCUITS
Filed March 10, 1966 3 Sheets-Sheet 2

Oskar Stürzinger,
Inventor

By Wenderoth, Lind & Ponack, attys.

Fig. 3

<≡↓STANLEYS|||EXPEDITIONSZUG|||QUER|||DURCH|||AFRIKA<
≡WIRD|||VON|||JEDERMANN|||BEWUNDERT|||↑1|||2|||3|||4|||5|||6|||7<
≡8|||9|||0.|||↓THE|||QUICK|||BROWN|||FOX|||JUMPS|||OVER|||THE<
≡LAZY|||DOG|||||||||VOYEZ|||LE|||BRICK|||GEANT|||QUE|||J↑'↓EXA↑-<
≡↓MINE|||PRES|||DU|||WHARF↑.|||1|||2|||3|||4|||5|||6|||7|||8|||9|||0.↓<

FSHST|ANLEY|SJEXP|EDITI|ONSZU|GJQUE|RJDUR|CHJAF|RIKAF
SWIRD|JVONJ|JEDER|MANNB|EWUND|ERTJX|QJWJE|JRJTJ|YJUFS
IJOJP|MJHTH|EJQUI|CKJBR|OWNJF|OXJJU|MPSJO|VERTH|EFSLA
ZYJDO|GJJJV|OYEZJ|LEJBR|ICKJG|EANTJ|QUEJX|GXHEX|DHAXA
FSHMI|NEJPR|ESJDU|JWHAR|FXMJQ|JWJEJ|RJTJY|JUJIJ|OJPMH|F

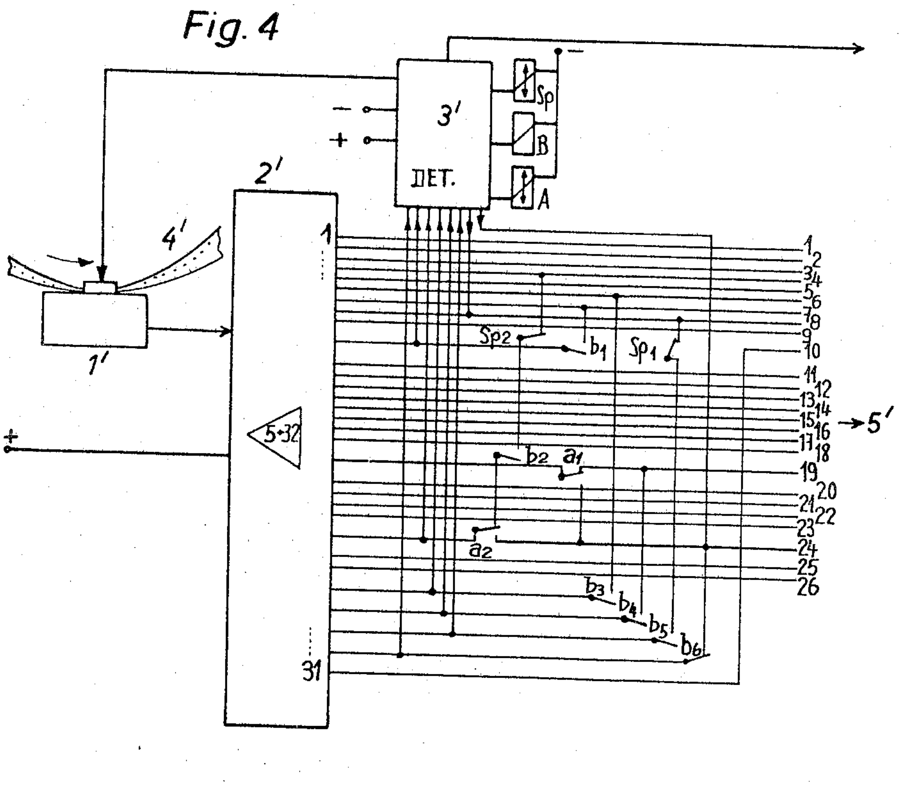

Fig. 4

Oskar Stürzinger, Inventor
By Wenderoth, Lind & Ponack, attys.

3,480,729

APPARATUS FOR OBTAINING REDUCED TELECOMMUNICATION ALPHABETS AND CIRCUITS

Oskar Stürzinger, Baar, Zug, Switzerland, assignor to Anstalt Europaische Handelsgesellschaft, Vaduz, Liechtenstein Filed Mar. 10, 1966, Ser. No. 533,244
Claims priority, application Switzerland, Mar. 12, 1965, 3,462/65
Int. Cl. H04l 15/24, 15/34, 17/16
U.S. Cl. 178—26 4 Claims

ABSTRACT OF THE DISCLOSURE

A device associated with a teleprinter station condensing to reduced alphabet messages transmitted. An unreduced international standard teleprinter alphabet is used with a code converter having as many outputs as there are combinations in the code of the unreduced international alphabet. A detector means is connected to a plurality of relay means for individually controlling each relay means. Individual means connect to the detector means each output of the code converter that corresponds to a symbol the position of which was changed in the reduction of the alphabet. There are as many outputs as there are distinct combinations in the reduced alphabet. Switch means are controlled by the relay means, for connecting to the corresponding output each of those code converter outputs corresponding to a symbol shifted in position. The detector controls stopping means for stopping operation of the sender during operation of the switch means.

The present invention relates to an apparatus for reducing the number of combinations in the international teleprinting alphabet and to means for carrying out the method.

In telecommunications today the CCITT alphabet No. 2, for example, is used internationally for teleprinting. This five-unit permutation code employed with the alphabet enables one to obtain thirty-two different combinations.

Twenty-six of these combinations correspond to the twenty-six letters of the Latin alphabet. Five of the combinations have a purely technical function, of which two ("letter shift" and "figure shift" combinations, Nos. 29 and 30) serve to give the said twenty-six combinations a double function. The receiving device is so designed that it can assume only two different "states," which are determined by combinations 29 and 30. If combination 29 is received, all following combinations (or resulting signals) of the said twenty-six combinations will be interpreted as letters of the alphabet, whereas if a combination 30 (or rather the signal of that combination) is received, all following signals of the said twenty-six combinations will be interpreted as figures or as punctuation marks. As a rule, the thirty-second combination is not used.

There are instances where the CCITT code No. 2 is employed with alphabets having more than twenty-six letters. Combinations 6, 7 and 8 (on figure shift side or upper case), which generally are free, provide space for three additional letters; and in Scandinavia, for example these combinations (upper case) are given over to letters (for example, the ø common in Danish) peculiar to the Nordic tongues.

Moreover, combination 32, which is not used according to international agreement, provides, in certain circumstances, space for two additional symbols.

For still larger alphabets it is necessary to combine. In the Near East, for example, the functions "carriage return" and "line feed" (CCITT combinations 27, 28) are combined and assigned to combination 28 ("line feed") (lower case). The call signal is then assigned to combination 28 (upper case), so that combination 27 now provides space for two symbols and combination 4 (previously assigned to the call signal, upper case) space for one additional symbol. Moreover, the function represented by the symbol "bell" (combination 10, upper case, in the CCITT code No. 2) is combined with the function "figure shift" and assigned to combination 30, leaving combination 10 free for one additional symbol. It is also known to combine the functions "letter shift" and "space." Finally, telecommunication systems are known in which each combination serves three and even four different functions or purposes. The systems of the Far East are an example of this, as well as those for the direct transmission of news dispatches to the composing rooms of newspapers.

The need for combination also arises where enciphered dispatches are to be transmitted over the public telegraph system. According to Article 20 (155, 156) of the International Telegraph Regulations, in this case only groups of letters or numbers can be sent.

The present invention relates to a method and to apparatus, whereby present international telecommunication codes can be concentrated, or reduced, so that all of the functions together require fewer combinations.

The invention is based upon the fact that certain letters of the five most important tongues employing the Latin alphabet but seldom appear. These letters are specially treated in a way requiring more than simply striking a key of a keyboard.

An object of the invention is to provide a method for obtaining telecommunication alphabets having a reduced number of symbols.

A further object of the invention is to provide apparatus for carrying out the method.

These and further objects of the invention will be apparent from the following detailed description of the invention made with reference to the drawings, wherein:

FIGURE 3 is a comparison of a text as recorded employing the CCITT alphabet No. 2 and as employing a reduced alphabet of FIGURE 1; and FIGURE 4 shows in partly schematic and partly diagrammatic form a device for automatically transmitting in the form of a reduced alphabet of FIGURE 1 a text employing the CCITT alphabet No. 2.

Proceeding, by way of example, from the CCITT alphabet No. 2, the present invention enables the printing of a message by the teleprinter, but wherein a perforated tape resulting from the method of the invention has only twenty-six different combinations, which logically may correspond to the combinations 1 to 26 of the CCITT alphabet. The symbols "bell" (combination 10, upper case) and that for "Who Are You" (combination 4, upper case) and their functions are eliminated, since they are unnecessary for the intended purpose. Moreover, if the perforated tape is manually or automatically punched after every five letters with the space signal (number 31 in the CCITT alphabet No. 2), the tape can be used to transmit by wire the message recorded thereon to the next telegraph office, which then retransmits the message by other means. Of course, it is also possible to by-pass the tape and send the message in the reduced text of the invention directly by wire to the telegraph office, or even to connect the output of a reducing circuit of the invention to a conventional teleprinter, which then prints a message composed of letter groups of five letters.

Figure 1:
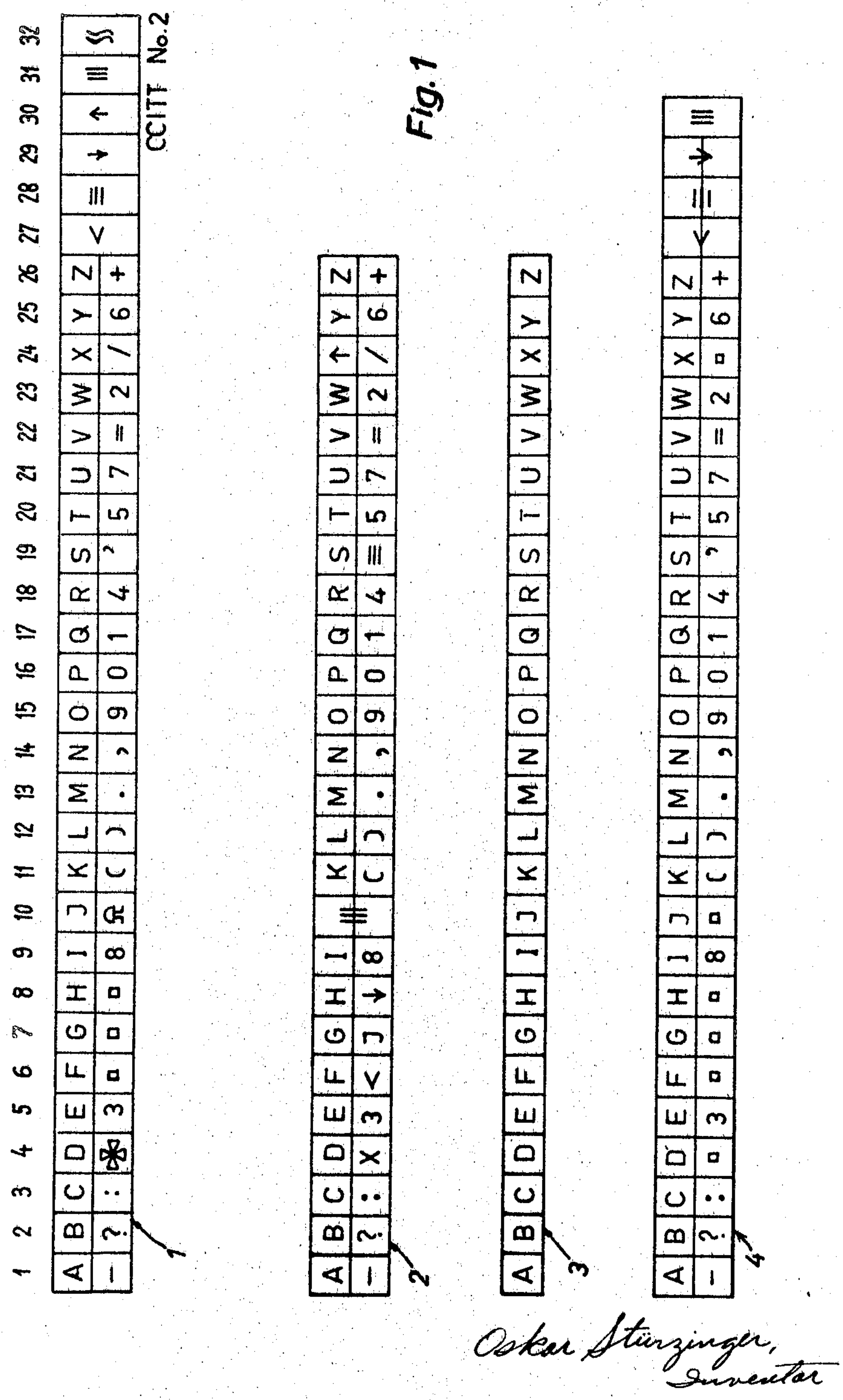
FIGURE 1 is a comparison of the positions of the symbols in the CCITT alphabet No. 2 with those of the reduced codes of the invention.

Referring to FIGURE 1, reference numeral 1 indicates the CCITT alphabet No. 2, reference numeral 2 the alphabet reduced in size in accordance with the rules to be given below, reference numeral 3 an alphabet as printed by a teleprinter receiving signals from a sender employing the reduced alphabet. The reference numeral 4 indicates an alphabet obtained by applying the invention in an alternative way to be described.

The alphabet, by way of example only, can be reduced in the following manner (see 1 and 2 of FIGURE 1).

(1) The letter X is treated as a figure and assigned to combination 4, upper case.

(2) The function "carriage return" is treated as a figure and assigned to combination 6, upper case.

(3) The letter J is treated as a figure and assigned to combination 7, upper case.

(4) The function "letter shift" is treated as a figure and assigned to combination 8, upper case.

(5) The function "space" is assigned to both figure and letter shift sides of combination 10 (the "bell" function having been eliminated, as previously noted).

(6) The function "line feed" is treated as a figure and assigned to combination 19, upper case.

(7) The apostrophe (') is combined with the fraction bar (/) and assigned to combination 24, upper case.

(8) The function "figure shift" is treated as a letter and assigned to combination 24, lower case.

It would also be possible to retain the apostrophe (') and to place it at combination 10 (upper case) and to confine the space function only to combination 10 (lower case). It is at the discretion of the user to determine whether or not dropping the apostrophe as an independent character results in quicker transmission. If it is dropped as an independent character (as shown in the alphabet 2 of FIGURE 1), the space function at combination 10, because it occupies, as shown, both the letter shift and figure shift portions of the alphabet, will be printed by the receiver whether the latter is switched to letter shift or figure shift. The space function appears frequently and as often with figure shift as with letter shift.

However, if the apostrophe is not retained as an independent symbol, the transmission time for five different languages is increased due to this transformation as follows:

| | Percent |
|---|---|
| German | 4.8 |
| English | 6.4 |
| French | 4.2 |
| Spanish | 4.5 |
| Italian | 4.0 |

The simplest manner of putting such a reduced alphabet into practice is a circuit, employed in conjunction with a teleprinter, or similar apparatus, having a suitably modified keyboard, which circuit causes the printing mechanism to reproduce the original readable text and simultaneously produces a sequence of signals (intended for a tape perforator or for direct transmission) that corresponds to the reduced code.

Figure 2:
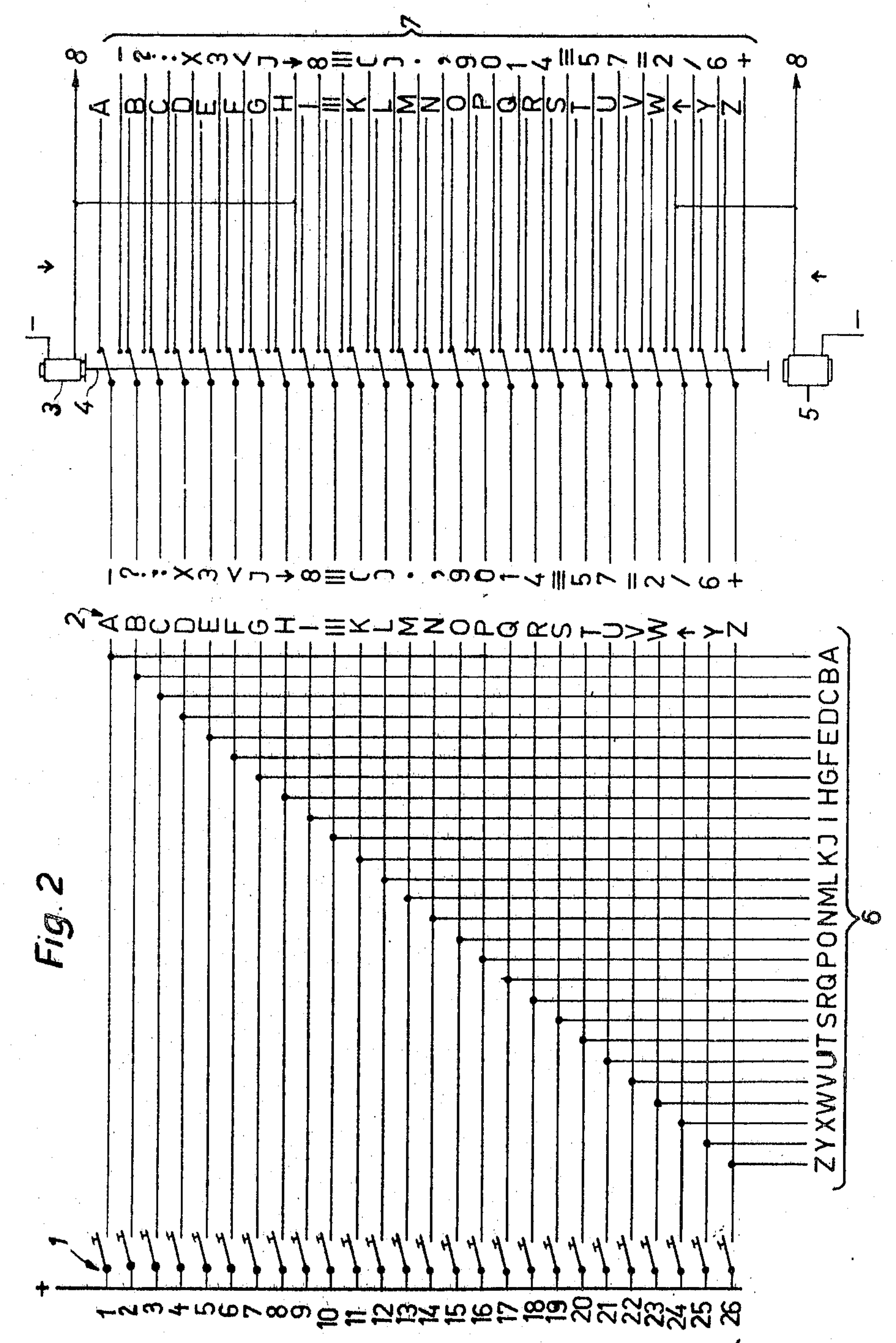
FIGURE 2 is a schematic of a switching circuit for obtaining a reduced alphabet of FIGURE 1.

One example of such a circuit is shown at FIGURE 2. Reference numeral 1 indicates the teleprinter keyboard having twenty-six keys. Each key has an operating contact. Indicated upon each key are the two printing characters or function symbols, as shown at 2, associated with the leter shift or figure shift. A twenty-six pole switch 4 can be switched between an upper position (letter shift position) and a lower position (figure shift position) by electromagnets 3 and 5, respectively. The switch is shown in its letter shift position. At 6 twenty-six leads are connected to a printer or tape perforator, not shown. The printer for the original text is connected to the leads at 7. The printer will have 2 x 26 printing functions.

The circuit is connected to a current source, the positive side of which is connected to the keyboard 1. The remaining components of the circuit are connected to the negative side, so that closing the contact of a key causes a current to flow. Means for interrupting the printing and paper fed are connected at 8, in order to avoid interspersing the printed text with symbols having a purely technical function.

The schematic of FIGURE 2 shows the manner in which the reduced alphabet 2 of FIGURE 1 is obtained. From the schematic it is to be noted that the same fundamental circuit can be used to obtain an intelligible text from a reduced text. That is, if a keyboard or a perforated tape reader, or similar device, is so connected at 6 that the signals of the twenty-six combinations are correlated with the twenty-six leads it feeds at 6, a reduced text fed at 6 will be printed at 7 in its original, readable form.

Referring to FIGURE 3, an original, readable text, including the symbols for purely technical functions, is shown at the top. Below, the reduced text is shown, containing only letters of the alphabet. These are the conventional sentences in German, English, and French employing all of the letters (in French and German, the unmodified letters only) of the alphabet. The reduced text would be obtained where, for example, a normally operating teleprinter connected at 6; in which case the printing mechanism of the teleprinter would be controlled by the twenty-six leads. Otherwise, for a conventional teleprinter a code converter for the five-unit permutation code would be connected in combination with a suitable signal sender.

It may occur that a text in the CCITT alphabet No. 2 must be transmitted for the purpose of recording it, for example, on perforated tape in its reduced form. In this event the following points should be borne in mind.

All symbols that in the CCITT alphabet occupy both letter shift and figure shift positions (and in the reduced alphabet occupy only one or the other position), as well as all characters in the CCITT alphabet that occupy only one or the other position, must cause, before they can be fed to the recording device, a suitable switching. Moreover, they must be fed to the device through a modifier that causes the necessary shift in position. Also, in certain circumstances the switching for the next character must be cancelled.

Using the French phrase QUE J' EXAMINE (meaning "that I Examine") as example (see FIG. 3, upper block, end of line 4), the letters QUE are taken over from the readable text (upper block, FIG. 3) without change. The next symbol is "space" which is on key 10 (FIG. 2). Operation of this key causes letter J to be printed (see outputs 6 in FIG. 2). After "space" follows the letter J proper which is on key 7 on the figure side. It is necessary, therefore, to provide for the signal "figure shift" first which is associated to key 24. Operation of this key produces an X at FIG. 2. Thereupon, key 7 may be operated (bearing letter J on the figure side) producing letter G at 6 in FIG. 2. Thereafter, the apparatus should be shifted to the figure side, an operation which has already been carried out and, therefore is no longer necessary.

The next symbol in the text is the apostrophe " ' " and this is reproduced by convention by means of the fraction line, which is on the figure side of key 24, producing again an X at 6 in FIG. 2. Next comes "letter shift" appearing on the figure side of key 8 and producing letter H at 6 in FIG. 2. The next letter E remains unchanged, while the next (X) is on the figure side of key 4. Therefore, key 24 has to be operated first, causing "figure shift" and producing an X at 6 in FIG. 2. The next step is to read in the X appearing on the figure side of key 4 and producing a D at 6 in FIG. 2. Next reading-in is "letter shift" appearing on figure side of key 8 and producing letter H, etc.

FIGURE 4 shows one example of a device suitable for feeding a reducing circuit, such as shown at FIGURE 2. A known tape reader 1' has five outputs (only one shown), connected to a known code converter 2' that transforms the five-unit permutation code into the sequence 1 to 32. The converter has as many outputs as there are distinct combinations in the unreduced alphabet.

The thirty-two outputs of the convertor 2' are connected to twenty-six leads at 5', some of the outputs being connected via switches $a_1$, $a_2$ . . . , $b_1$, $b_2$ . . . , $Sp_1$, and $Sp_2$. A circuit, such as that shown at FIGURE 2, can be connected to the device of FIGURE 4, the leads at 5', FIGURE 4, being connected to the leads at 6, FIGURE 2.

All of the outputs that must cause switching (that is, those outputs corresponding to symbols the positions of which were changed in the reduction of the alphabet) are connected to a detector 3' (a relay or similar device) of known design. The detector can stop the tape feed in the reader 1 and send control signals to the circuit connected to the leads at 5.

If, for example, the letter J (combination No. 10, lower case, in the CCITT alphabet) is to be obtained, a signal from the detector 3' first of all is conducted along lead 24 to cause the circuit connected at 5' to switch to figure shift. Simultaneously, the detector 3' stops the paper feed at 1'. Further, the detector 3' now energizes relay B feeding lead 7 via switch $b_1$, to send a control signal to the circuit connected at 5'. Following this, relay B is deenergized and a signal sent on lead 8 to switch the circuit connected at 5' back to "letter shift," on command of the detector 3'. For the following reason this latter switching is necessary, even if the next recorded symbol on the perforated tape is combination No. 30 for causing switching to "figure shift" again: every character on the tape must, in this or a similar way, be obtained in the circuit connected at 5. Even if the circuit connected at 5' is switched to "figure shift" it is still incapable of responding to combination 30, because in the reduced code the combination for causing switching to "figure shift" is located at combination 24 on the upper case of the alphabet. After this switching the tape feed is permitted by the detector 3' to resume operation until the next symbol.

It should be noted that each time combinations 29 and 30 appear the relay SP is operated, in order to prevent, should these combinations appear successively, the successive transmission of these combinations to the circuit connected at 5'. The reason for this will be presently explained. They are the only combinations which, should they appear in succession on the tape, can be eliminated without loss of information, when converting to the reduced code. As soon as the reader 1' senses a different combination, the relay SP is deenergized.

If the combination 30 (for switching to "figure shift") is sensed on the tape, relay A is closed and remains closed until the combination 29 (for switching to "letter shift") is sensed.

Thus, it may occur that when the cymbol fraction bar (/), combination 24, is to be transmitted to 5', it is immediately preceded by combination 30 on the tape. The signal of combination 30 is conducted, via the connection between output 30 and the detector 3', to detector 3' and also, via normally closed contact *b6*, to lead 24, and thus to the circuit connected at 5'. In this way, the signal for figure shift is conducted to 5'. When the combination 24 is sensed by the reader 1', the signal is conducted over lead 24 via the now closed contact $a_2$. The circuit connected at 5', which has previously been switched to figure shift, reproduces the desired fraction bar.

A variation intended exclusively for control from tape will now be described, having a simplified operation. The embodiment is based on the fact that a dispatch for transmission by teleprinter cannot contain more than thirty-two different combinations. Those symbols in the CCITT alphabet that are on both the letter shift and figure shift sides of the alphabet are not distinguished during transmission from those that are on the one or the other side. Only the receiver contains means for switching between letter shift and figure shift, which, operated by a signal occurring at a precise moment, distinguishes all following symbols differently.

The thirty-two available combinations or corresponding symbols are numbered 1 to 32, which are to be so reduced that once again only twenty-six places or positions are used, numbered 1 to 26. Places 1 to 24 are occupied by letters A to X. Place 25 is given over to the letter Y and also to the internal function of switching to "figure shift." Place 26 is given over to the letter Z and has also the internal function of switching to "letter shift."

The symbols 25 to 32 are assigned internally to places 1 to 8, figure shift.

The reducing circuit operates as follows. If a symbol 25 to 32 is received, the unit first always inserts the combination of place 25, which appear at the output as the letter Y but internally causes a switching to "figure shift." Following this, that one of the combinations 1 to 8 corresponding to the received symbol is conducted to the output. Finally, the letter Z is conducted to the output and internally there is a switching back to "letter shift." In other words, every appearance of a symbol 25 to 32 at the output occasions three "steps": the combination for the letter Y, followed by that combination of the combinations 1 to 8 corresponding to desired one of the symbols 25 to 32, and ending with the combination for the letter Z.

The device (assumed to be capable of receiving only twenty-six combinations) is so designed that, in the three "steps" above, whenever it receives the combination for Y, the combination is not further transmitted but internally does cause a switching to "figure shift," that on receiving one of the combinations 1 to 8, the corresponding symbol 25 to 32 is obtained; and finally that in the third "step," which necessarily is the reception of the combination for Z, the signal of the combination is not conducted to the output.

The result is the same as in the previous example: information recorded by use of thirty-two different symbols can be represented by twenty-six symbols.

It occurs in practice that a direct wire connection between sender and receiver is available. In this case one can at once simply transmit employing the thirty-two combinations, inasmuch as it is not necessary to have sequences of printable symbols arranged in groups, since an evaluator (teleprinter receiver) can be directly connected to the lead of the receiver.

If an enciphered message is to be transmitted, binary enciphering of the code elements preferably is employed, which requires, however, a different arrangement of the apparatus.

If it is desired to operate line dependent and line independent with the least expenditure, a solution presents itself that is fundamentally similar to the above-described reducing arrangement, but which results in a minimum of lengthening of the text.

For this purpose the CCITT alphabet No. 2 can be altered in the following way.

(1) Space (combination 31) and letter X are considered alike and treated as an X.

(2) The fraction bar (combination 24, upper case) and the apostrophe (combination 19, upper case) are considered alike and treated as an apostrophe.

(3) Combination 30 for switching to figure shift is treated as a "space" (combination 31).

Symbols 27 and 28 remain unchanged. A text printed with this code by a page teleprinter requires nearly the same number of lines as does one printed with the CCITT code.

If a line is used for transmitting enciphered texts and the enciphering is done automatically by apparatus using only twenty-six symbols, it is possible with this last variation to have all monitoring teleprinters connected to the line print the deciphered text, which is not possible with the otherwise customary binary enciphering of the code elements. Moreover, the same enciphering equipment fundamentally can be used as in the earlier described method: an important advantage in operation.

The alphabet resulting from the above changes is shown at 4 in FIGURE 1. The circuit for use with this alphabet is not shown, since the previously described circuits make it possible for one skilled in the art to design an appropriate circuit without particular effort.

I claim:

1. Device associated to a teleprinter station for condensing to reduced alphabet messages to be transmitted by said station using an unreduced international standard teleprinter alphabet, comprising a code converter having as many outputs as there are combinations in the code of the unreduced international alphabet; a plurality of relay means; detector means connected to said plurality of relay means for individually controlling each of the latter; individual means connecting to said detector means each output of said code converter that corresponds to a symbol the position of which has changed in the reduction of the alphabet; a plurality of outputs for said device, there being as many outputs as there are distinct combinations in the reduced alphabet; a plurality of switch means controlled by said plurality of relay means, for connecting to the corresponding output of said device each of those code converter outputs corresponding to a symbol shifted in position.

2. Apparatus of claim 1, including stopping means controlled by said detector for stopping operation of the sender during operation of said switch means.

3. Apparatus of claim 1, wherein said plurality of switch means includes switch means for each of the combinations "figure shift" and "letter shift," which are operated when these combinations are transmitted by the sender, to prevent the repeated appearance of the signals of these combinations at the outputs of the device, when these combinations are successively transmitted.

4. Apparatus of claim 3, including means for selectively operating said switch means associated with the combinations "figure shift" and "letter shift."

References Cited

UNITED STATES PATENTS

| | | | |
|---|---|---|---|
| 2,046,964 | 7/1936 | Nelson | 178—26.5 |
| 2,458,144 | 1/1949 | Bush | 178—26.5 |
| 2,847,503 | 8/1958 | Diamond et al. | 178—26.5 |
| 2,997,541 | 8/1961 | Grottrup | 178—26.5 |
| 2,471,076 | 5/1949 | Moore | 178—17 XR |
| 2,737,545 | 3/1956 | Augustin | 178—79 XR |
| 2,859,276 | 11/1958 | Saykay | 178—17 |
| 2,927,961 | 3/1960 | Jacobs | 178—26 |
| 3,017,461 | 1/1962 | Mitchell et al. | 178—26 |
| 3,057,955 | 10/1962 | Hirsch | 178—26 |

THOMAS A. ROBINSON, Primary Examiner

U.S. Cl. X.R.

178—79